W. Dawson,

Safety Valve.

No. 97,485. Patented Dec. 7, 1869.

Witnesses:
Gustave Dieterich
Alix F. Roberts

Inventor:
W. Dawson
per
Attorneys

United States Patent Office.

WALTER DAWSON, OF SCRANTON, PENNSYLVANIA.

Letters Patent No. 97,485, dated December 7, 1869.

IMPROVEMENT IN SAFETY-VALVES.

The Schedule referred to in these Letters Patent and making part of the same

*To all whom it may concern:*

Be it known that I, WALTER DAWSON, of Scranton, in the county of Luzerne, and State of Pennsylvania, have invented a new and improved Safety-Valve; and I do hereby declare that the following is a full, clear, and exact description thereof, which will enable others skilled in the art to make and use the same, reference being had to the accompanying drawings, forming part of this specification.

Similar letters of reference indicate corresponding parts.

Figure 1:
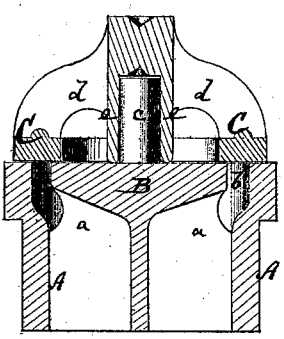
Figure 1 represents a sectional side view of my improved safety-valve.
Figure 2:
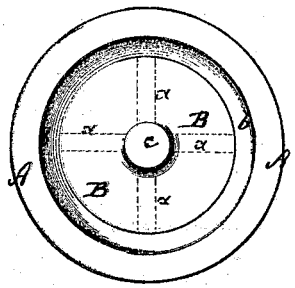
Figure 2 is a plan or top view of the valve-seat.
Figure 3:
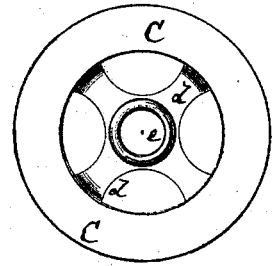
Figure 3 is an inverted plan view of the valve.

My improvement relates especially to spring safety-valves, such as are used upon locomotive-engines; and The improvement consists in the construction and arrangement of parts, as hereinafter described.

In carrying out my invention, I provide a valve with a flat surface, and an annular aperture for the escape of the steam, with a flat horizontal bearing-surface. I also provide the valve with an inverted guide-socket, for receiving a central guide-pin, which is fixed to the seat.

A, in the drawing, represents a shell or tube, which, in connection with a central disk, forms the valve-seat.

The shell or tube A has within it, supported by means of arms $a\ a$, a central disk, B, between which and the shell or tube A is an annular opening, $b$, for the escape of steam.

The face of the disk B is flush with a portion of the upper edge of the tube or shell A, as shown in the figures, and the valve when closed rests in part upon the shell or tube A, and in part upon disk B, in such a manner as entirely to cover the annular spring $b$.

A pintle, $c$, projects upward from the centre of the disk B.

The shell or tube A is fitted upon the boiler or steam-generator, in the same manner as any other safety-valve.

C is the valve, consisting of an open ring with a flat face, and having connected with it, by arms $d\ d$, a central socket, $e$, which receives the pintle $c$.

The valve is guided by the socket $e$, and moves up and down upon the pintle $c$.

The valve is of such size that it will cover the annular aperture $b$.

When the valve is raised, the steam freely escapes through the annular opening $b$, both around and within the valve The socket $e$ being in an inverted position on the valve, will not retain dust or other impurities entering it, and will therefore never become clogged.

I am aware that flat valves and seats are not in themselves new.

Having thus described my invention,

I claim as new, and desire to secure by Letters Patent—

The combination, with the flat valve and seat, of the inverted socket $e$ and pintle $c$, substantially as herein shown and described.

WALTER DAWSON.

Witnesses:
A. E. BEACH,
EDGAR TATE.